US012773876B2

(12) United States Patent
Hayes et al.

(10) Patent No.: US 12,773,876 B2
(45) Date of Patent: Oct. 27, 2026

(54) AXLE SYSTEM

(71) Applicant: ArvinMeritor Technology, LLC, Troy, MI (US)

(72) Inventors: Brian D. Hayes, Newark, OH (US); Nicholas Bofferding, Royal Oak, MI (US); Andrew J. Bodary, Clarkston, MI (US); Paul Gaecke, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 147 days.

(21) Appl. No.: 18/917,821

(22) Filed: Oct. 16, 2024

(65) Prior Publication Data

US 2026/0103025 A1 Apr. 16, 2026

(51) Int. Cl.

*B60B 27/06* (2006.01)
*B60B 35/04* (2006.01)
*F16B 39/02* (2006.01)

(52) U.S. Cl.

CPC ............ *B60B 27/065* (2013.01); *B60B 35/04* (2013.01); *F16B 39/02* (2013.01); *B60B 2900/113* (2013.01); *B60B 2900/115* (2013.01); *B60B 2900/531* (2013.01); *B60B 2900/541* (2013.01)

(58) Field of Classification Search

CPC .... F16B 39/02; Y10S 411/95; Y10S 411/951; Y10S 411/952; B60B 27/065; B60B 35/04

See application file for complete search history.

(56) References Cited

U.S. PATENT DOCUMENTS

| | | | | |
|---|---|---|---|---|
| 10,368 A * | 1/1854 | Paige | F16B 39/32 | 411/328 |
| 338,448 A * | 3/1886 | Teed | F16B 39/32 | 411/329 |
| 500,095 A * | 6/1893 | Bradford | F16B 39/32 | 411/328 |
| 544,605 A * | 8/1895 | Woolcock | F16B 39/32 | 411/328 |
| 575,358 A * | 1/1897 | Kollenberg | F16B 39/32 | 411/328 |
| 644,726 A * | 3/1900 | Voller | F16B 39/10 | 411/329 |
| 879,714 A * | 2/1908 | Abe et al. | F16B 39/32 | 411/329 |
| 2,372,889 A * | 4/1945 | Duggan | F16B 39/32 | 81/10 |
| 6,206,625 B1 * | 3/2001 | Dessouroux | F16B 39/04 | 411/211 |
| 6,264,411 B1 * | 7/2001 | DiStasio | F16B 39/32 | 411/950 |

* cited by examiner

*Primary Examiner* — Kip T Kotter
(74) *Attorney, Agent, or Firm* — Jordan IP Law, LLC

(57) ABSTRACT

Aspects of the present invention relate to an axle system, a spindle nut, a spindle nut and a spindle. The axle system comprises a spindle and a spindle nut. The spindle has a threaded portion and a ratchet portion, the spindle nut has a threaded portion and at least one pawl. The threaded portions are sized to engage one another. The at least one pawl is arranged to engage the ratchet portion of the spindle.

11 Claims, 13 Drawing Sheets

AXLE SYSTEM

TECHNICAL FIELD

The present disclosure relates to an axle system. Aspects of the invention relate to an axle system comprising a spindle and a spindle nut; to a spindle nut; to a further axle system comprising a spindle nut and a spindle; and to a spindle.

BACKGROUND

Traditional multi-piece spindle nut packs that are used to retain commercial vehicle wheel bearings are well known in the industry. These designs have a twofold locking method—the jamming action of the two nuts tightened against each other and a separate lock washer. This arrangement provides redundancy for the prime function of wheel bearing retention. Installation of traditional multi-piece spindle nut packs requires a detailed procedure and can be time consuming. Their installation also requires verification of endplay with a dial indicator and is not suitable for applying preload.

Easy-to-install spindle nut assemblies with a single nut and integral locking features are also known. However, the retention function of such nut assemblies is typically not double-redundant, since they do not incorporate a nut-to-nut jamming arrangement. This means that the locking features of such nut assemblies are more important. These types of nut assemblies are often used with bearing spacers to eliminate the requirement to verify endplay with a dial indicator.

All the above designs rely on spindle keyways or flats to provide an anti-rotation function. This effectively limits any locking features to be configured exclusively for torque reaction to a keyway or flat. Some of the most popular of current spindle nuts use a separate keeper ring installed after the nut is tightened. If this keeper ring is not installed, the wheel assembly is no longer positively retained.

The present invention aims to address one or more of the disadvantages associated with the prior art.

SUMMARY OF INVENTION

Aspects and embodiments of the invention provide an axle system, a spindle nut, a further axle system and a spindle as claimed in the appended claims.

According to an aspect of the present invention, an axle system comprises a spindle and a spindle nut, wherein the spindle has a threaded portion and a ratchet portion, the spindle nut has a threaded portion and at least one pawl, wherein the threaded portions are sized to engage one another, and the at least one pawl is arranged to engage the ratchet portion of the spindle.

This axle system provides a robust locking device that is easy and intuitive to install and remove and does not require the installer to add any parts after the tightening torque is reached.

The ratchet portion may be formed at an end of the spindle, or in the threaded portion of the spindle, or the ratchet portion may be press-fitted to an end of the spindle.

These arrangements support ease of assembly and reduce the number of parts required in the axle system.

The ratchet portion may include an anti-rotation feature that engages with a co-operating anti-rotation feature of the spindle.

The anti-rotation feature of the ratchet portion may be a key and the anti-rotation feature of the spindle may be a notch.

The ratchet portion may be handed to match the hand of the threaded portion of the spindle.

According to another aspect of the invention, there is provided a spindle nut comprising a unitary body having a washer portion and a tool interface portion, wherein the tool interface portion has an anti-reversing feature comprising at least one pawl arranged to engage a ratchet of a spindle.

The at least one pawl may comprise one of a sprung pawl or a rocker pawl.

The at least one pawl may be biased to engage a ratchet of a spindle.

The at least one pawl may comprise a tooth and a shoulder, wherein the shoulder is biased to extend radially beyond the tool interface portion.

During installation, when the tool is installed on the tool interface portion, the shoulder is engaged by the tool to pivot the at least one pawl out of engagement with the ratchet.

The at least one pawl may pivot about an axis which runs in parallel with an axis of the spindle nut.

The at least one pawl may pivot about an axis which runs perpendicularly to an axis of the spindle nut.

The at least one pawl may comprise a first pawl and a second pawl, and wherein the first pawl and the second pawl are circumferentially located at uneven clocking relative to the ratchet teeth.

The effective precision of the ratchet teeth is doubled by the uneven clocking.

The rocker pawl and the spring may be retained by a retaining ring.

This arrangement means no riveting of the at least one pawl is required.

According to yet another aspect of the invention, there is provided an axle system comprising the spindle nut according to the previous aspect of the invention, and a spindle, wherein the spindle has a threaded portion and a ratchet portion at an end of the spindle, wherein the at least one pawl is arranged to engage the ratchet portion of the spindle.

According to a further aspect of the invention, there is provided a vehicle comprising the axle system of the first aspect of the present invention.

According to a further aspect of the invention, there is provided a spindle for the axle system of the first aspect of the present invention, comprising a threaded portion and a ratchet portion, the threaded portion being configured to engage a threaded portion of a spindle nut and the ratchet portion being configured to be engaged by at least one pawl of a spindle nut.

The ratchet portion may formed at an end of the spindle. Alternatively, the ratchet portion may be formed in the threaded portion of the spindle. In a further alternative, the ratchet portion may be press-fitted to an end of the spindle.

The ratchet portion may include an anti-rotation feature that engages with a co-operating anti-rotation feature of the spindle.

The anti-rotation feature of the ratchet portion may be a key and the anti-rotation feature of the spindle may be a notch.

The ratchet portion may be handed to match the hand of the threaded portion of the spindle.

Within the scope of this application, it is expressly intended that the various aspects, embodiments, examples and alternatives set out in the preceding paragraphs, in the claims and/or in the following description and drawings, and, in particular, the individual features thereof, may be taken independently or in any combination. All embodiments and/or features of any embodiment can be combined in any way and/or combination unless such features are incompatible. The applicant reserves the right to change any originally filed claim or file any new claim accordingly, including the right to amend any originally filed claim to depend from and/or incorporate any feature of any other claim, although not originally claimed in that manner.

Further benefits and advantages of the present invention will become apparent from the following detailed description of at least one exemplary embodiment for carrying out the present invention with reference to the accompanying drawings.

BRIEF DESCRIPTION OF DRAWINGS

One or more embodiments of the invention will now be described, by way of example only, with reference to the accompanying drawings, in which.

DETAILED DESCRIPTION

Figure 1:
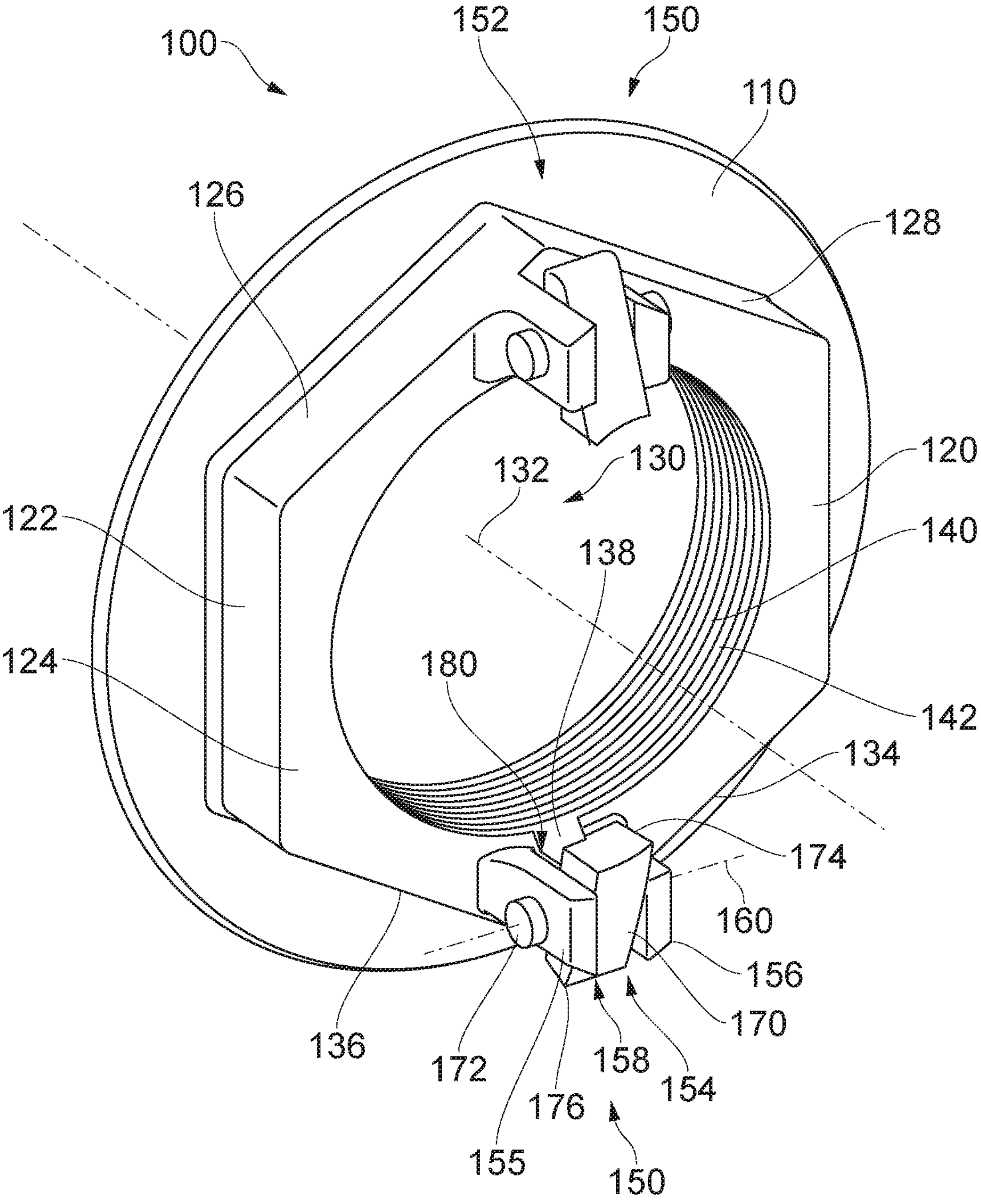
FIG. 1 is a perspective view of a spindle nut according to an embodiment of the invention.

With reference to FIG. 1 a view of a spindle nut 100 of the present application is provided. In the exemplary embodiments, the spindle nut 100 is designed to engage a spindle to seat a wheel-end assembly. The spindle nut 100 is a unitary body comprising a washer portion 110 and a tool interface portion 120. The washer portion 110 and tool interface portion 120 together define a bore 130 of the spindle nut 100. The bore 130 has an axis 132. The bore 130 is bounded by a threaded portion 140 of the spindle nut 100. The threaded portion 140 has internal threads 142 along the bore 130. The internal threads 142 are shaped to engage corresponding threads on the spindle in this particular example. The tool interface portion 120 is shown as an octagonal tool interface, with six equally sized flats 122, although any tool interface is possible.

The tool interface portion 120 has an anti-reversing feature. In the present embodiment, the anti-reversing feature is a pair of sprung pawls 150. In another embodiment of the present invention the anti-reversing feature is a single sprung pawl 150. The pair of sprung pawls 150 are arranged on a forward face 124 of the tool interface portion 120. The pair of sprung pawls 150 are distributed circumferentially. A first sprung pawl 152 is arranged between a first flat 126 and a second flat 128. The first sprung pawl 152 is thereby positioned at approximately 12 o'clock of the spindle nut 100. A second sprung pawl 154 is arranged between a fourth flat 134 and a fifth flat 136. The second sprung pawl 154 is thereby positioned at approximately 6 o'clock of the spindle nut 100. Each one of the pair of sprung pawls 150 are identical, so only the second sprung pawl 154 shall be described in detail.

The second sprung pawl 154 comprises a pair of arms 155, 156 extending from the forward face 124 of the tool interface portion 120. The pair of arms 155, 156 extend in parallel to the axis 132 of the bore 130. The pair of arms 155, 156 define a slot 158 therebetween. Adjacent the slot 158 and between the pair of arms 155, 156, a groove 138 is formed in the forward face 124 of the tool interface portion 120. The groove 138 houses a pawl spring 180 best shown in FIG. 4. The pair of arms 155, 156 each have a bore with a bore axis 160 running perpendicularly to the axis 132 of the bore 130. A pawl 170 is pivotally mounted in the slot 158 on a pin or rivet 172 aligned with the bore axis 160. The slot 158 restricts lateral movement of the pawl 170. The rivet 172 restricts transverse movement of the pawl 170. The pawl 170 can pivot about the bore axis 160 on the rivet 172. The pawl 170 therefore pivots on an axis which runs perpendicularly to the axis 132 of the spindle nut 100. The pawl 170 has a tooth 174 and a shoulder 176. The tooth 174 is sized to engage a tooth of the spindle as will be described in more detail below. The pawl spring 180 is arranged between the pawl 170 and the forward face 124 of the tool interface portion 120. The pawl spring 180 is under compression and tends to bias the pawl 170 so that the pawl 170 extends radially toward the center of the bore axis 132. The shoulder 176 is at the opposite end of the pawl 170 as the tooth 174. When the pawl 170 is biased such that the pawl 170 extends radially toward the center of the bore axis 132, the shoulder 176 overhangs the tool interface portion 120.

Figure 2:
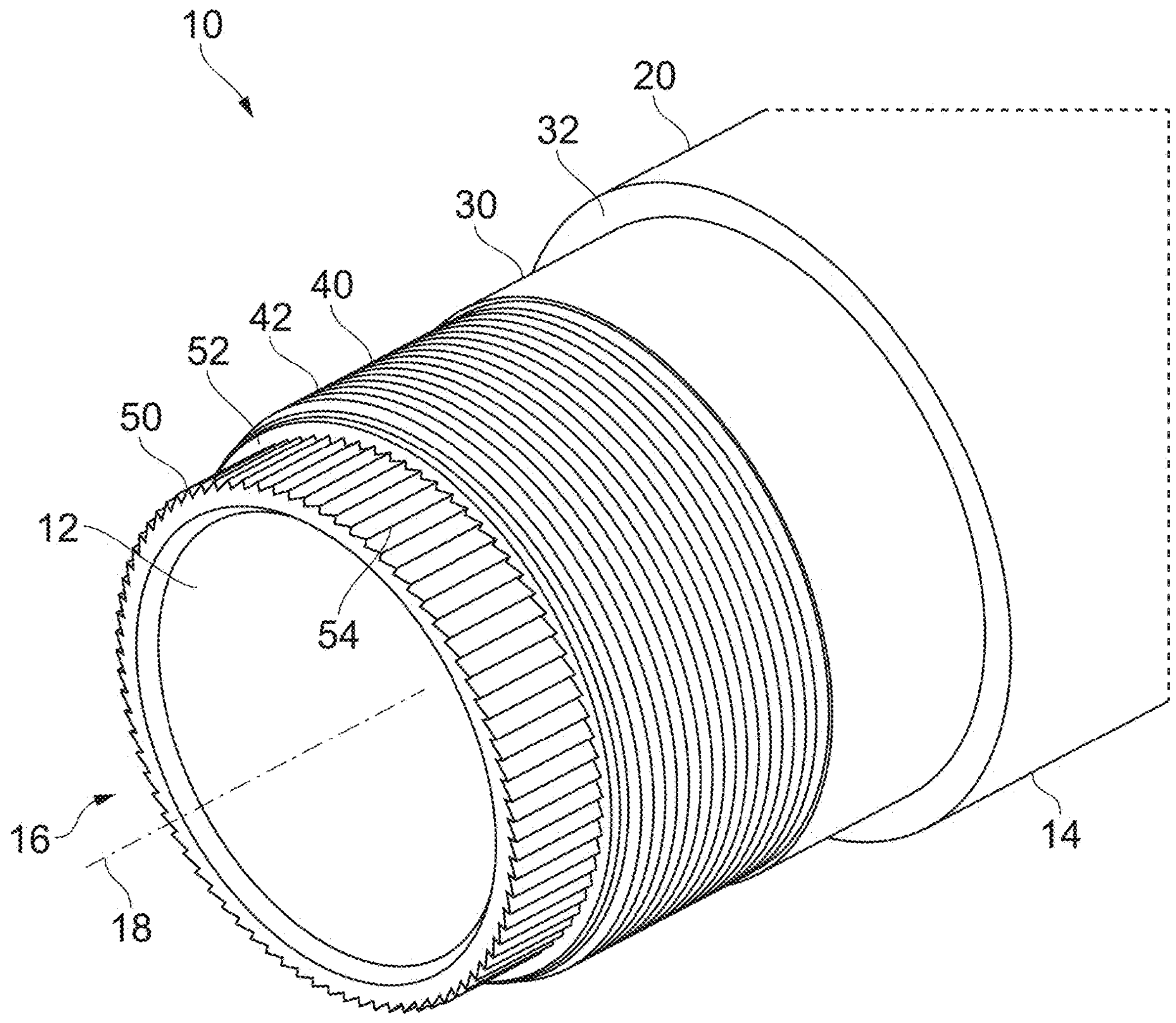
FIG. 2 is a perspective view of a spindle in according to an embodiment of the invention.

FIG. 2 shows a hub end of a spindle 10 to be used with the spindle nut 100 of the present invention. The spindle 10 includes a spindle body having an inner peripheral surface 12 and an outer peripheral surface 14. The spindle 10 defines a bore 16 having a spindle axis 18. The outer peripheral surface 14 of the spindle 10 is defined by a stepped profile that includes an inboard constant diameter section 20 and an outboard constant diameter section 30. The term "inboard" refers to a direction that is toward a vehicle center and the term "outboard" refers to a direction that is away from a vehicle center. The inboard constant diameter section 20 and outboard constant diameter section 30 are connected by an outboard bearing shoulder 32 that is machined or formed about the outer peripheral surface 14 of the spindle 10. The outer peripheral surface 14 of the spindle has a threaded portion 40 outboard of the outboard constant diameter section 30. The threaded portion 40 is sized to engage the spindle nut 10. The threaded portion 40 has external threads 42. The external threads 42 are shaped to engage with the corresponding internal threads 142 of the spindle nut 100. Further outboard of the threaded portion 40 is a ratchet portion 50. The threaded portion 40 and the ratchet portion 50 are connected by step 52 that is machined or formed about the outer peripheral surface 14 of the spindle 10. The ratchet portion 50 is provided with ratchet teeth 54 aligned with the axis 18 of the spindle 10. The ratchet direction is handed and is matched to the hand of the threads—in FIG. 3 conventional right-handed threads are shown. The ratchet portion 50 can be made using powdered metal or precision forging methods so that separate machining of teeth 54 is not necessary.

Figure 3:
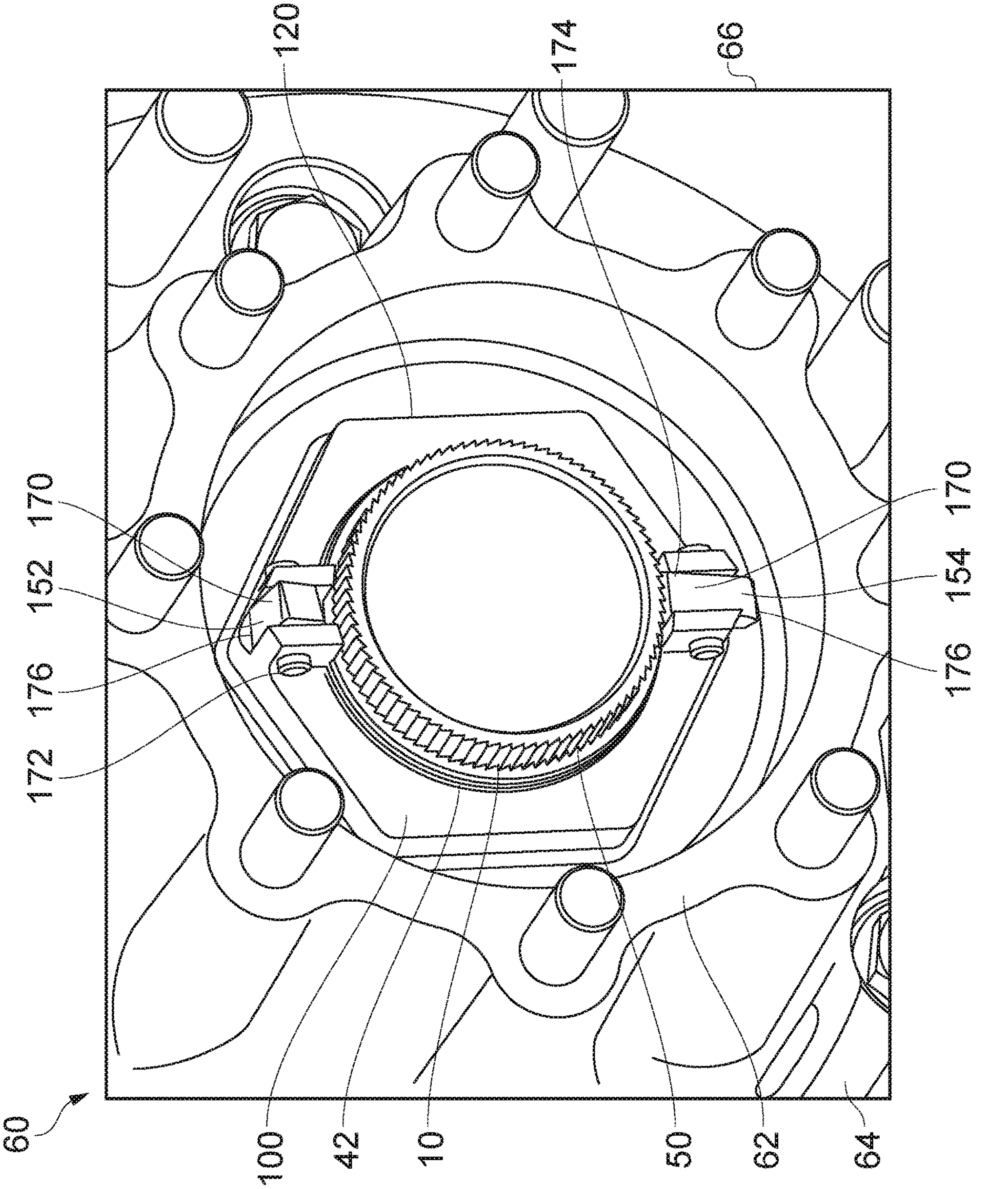
FIG. 3 is a perspective view of the spindle nut of FIG. 1 installed on the spindle of FIG. 2 as part of a wheel end assembly.
Figure 4:
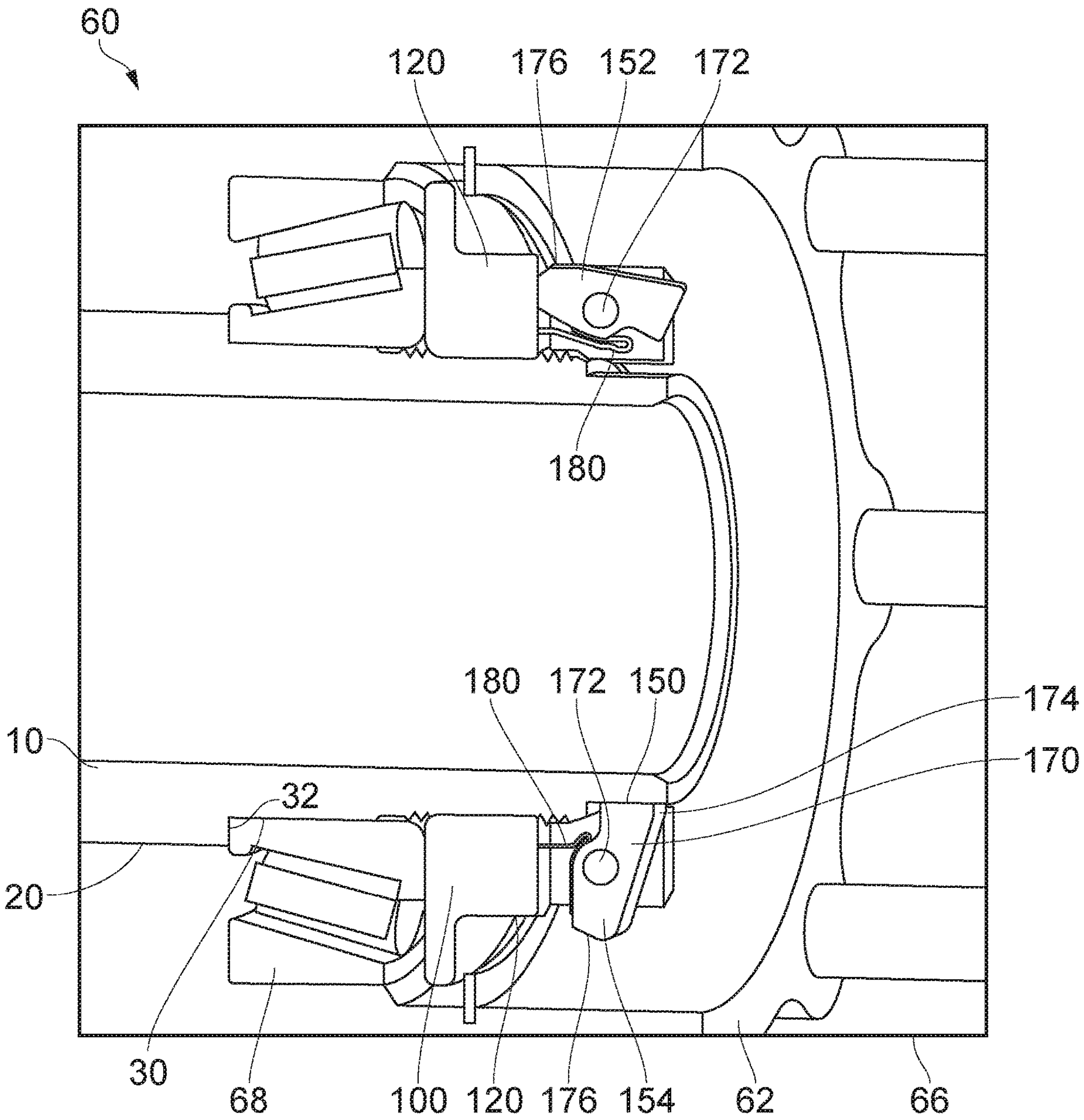
FIG. 4 is a cross-sectional view of FIG. 3.

FIGS. 3 and 4 show an axle system comprising the spindle nut 100 installed on the spindle 10. The axle system is part of a wheel end assembly 60. The wheel end assembly 60 includes a hub assembly 62, a hub 64 and a tyre 66 as is known in the art. The spindle nut 100 is in threaded engagement with the spindle 10, with some of the external threads 42 of the threaded portion 40 visible outboard of the spindle nut 10100. The spindle nut 100 holds an outboard bearing cone 68 fitted to the outboard constant diameter section 30 against the outboard bearing shoulder 32.

The first sprung pawl 152 positioned at approximately 12 o'clock of the spindle nut 100 is shown with the pawl 170 pivoted out of engagement with the ratchet portion 50. In use, the pawl 170 may be pivoted out of engagement by a wrench socket (not shown for clarity). As the wrench socket is brought into engagement with the tool interface portion 120, the wrench socket first bears upon the shoulder 176 of the pawl 170, causing the pawl 170 to pivot on the rivet 172 until the shoulder 176 is in-line with the tool interface portion 120, as shown with the first sprung pawl in FIGS. 3 and 4. In this condition the pawl spring 180 is compressed and energized further. Removal of the wrench socket de-energizes the pawl spring 180 and causes the pawl 170 to pivot back to its biased condition, that is as shown by the second sprung pawl 154 in FIGS. 3 and 4.

The second sprung pawl 154 positioned at approximately 6 o'clock of the spindle nut 100 is shown with the pawl 170 engaged with the ratchet portion 50. The tooth 174 of the pawl 170 abuts the ratchet tooth 54 of the ratchet portion 50 and prevents anti-clockwise rotation of the spindle nut 100. It will be understood that the first sprung pawl 152 and second sprung pawl 154 are shown in opposite engagement states by way of explanation only. In use, both the first and second sprung pawls 152, 154 will be biased into engagement with the ratchet portion 50. When an external force is applied, for example by a wrench socket, both the first and second sprung pawls 152, 154 will be biased out of engagement with the ratchet portion 50, as the socket bears against the respective shoulders 176 of the first and second pawls 152, 154 and against the action of the pawl springs 180, this allows anti-clockwise rotation of the spindle nut 100.

In use, the spindle nut 100 may be installed by hand onto the spindle 10. The sprung pawls 152, 154 engage the ratchet teeth 54 of the spindle ratchet portion 50 to prevent reverse threading of the spindle nut 100 on the spindle 10. To adjust the spindle nut 100, the use of a wrench socket provides an easy disengagement of the sprung pawls 152, 154 as the socket is pushed into position on the spindle nut 100 since the pawls 170 pivot in line with the tool interface portion 120.

In a further embodiment, the sprung pawls 152, 154 are located in a slightly uneven clocking so that the effective precision of the ratchet teeth 54 can be doubled. In this embodiment, only one of the two sprung pawls 152, 154 will engage the ratchet teeth 54 at a time. In an exemplary embodiment, for common 12 threads-per-inch spindle threads and a ratchet portion 50 with 72 individual ratchet teeth 54, such a clocking would make this the equivalent of 144 ratchet teeth 54, giving each click position a change in axial position of only 0.0006". Similar values can be attained with metric thread forms.

Figure 5:
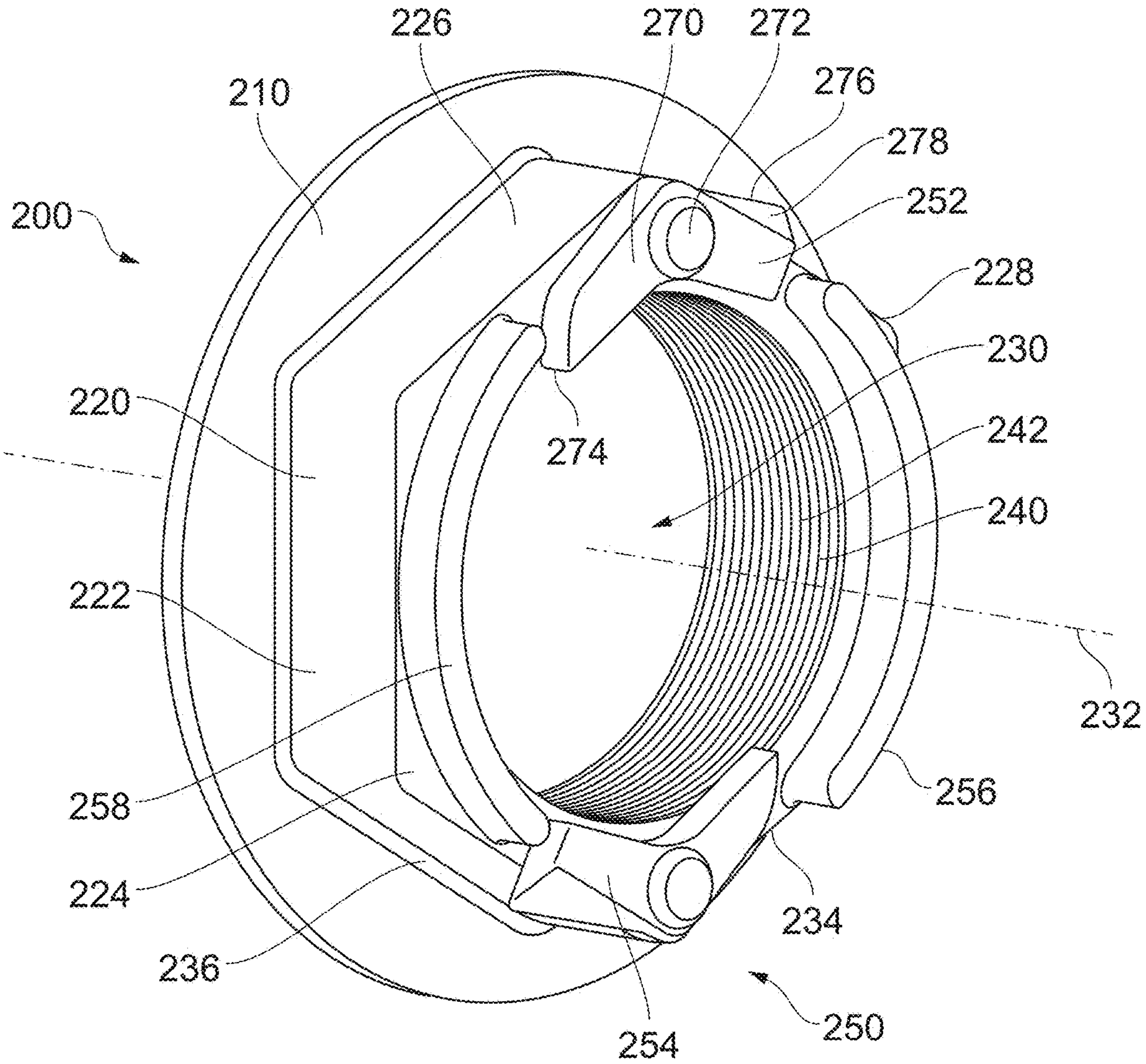
FIG. 5 is a perspective view of a spindle nut according to another embodiment of the invention.

FIG. 5 shows view of a spindle nut 200 in accordance with another embodiment of the present invention. Similar reference numerals have been used for features similar to those described in relation to spindle nut 100, pre-fixed with a "2" instead of a "1" to indicate those features as being in relation to spindle nut 200.

In the exemplary embodiments, the spindle nut 200 is designed to engage a spindle to seat a wheel-end assembly. The spindle nut 200 is a unitary body comprising a washer portion 210 and a tool interface portion 220. The washer portion 210 and tool interface portion 220 together define a bore 230 of the spindle nut 200. The bore 230 has an axis 232. The bore 230 is bounded by a threaded portion 240 of the spindle nut 200. The threaded portion 240 has internal threads 242 along the bore 230. The internal threads 242 are shaped to engage corresponding threads on the spindle in this particular example. The tool interface portion 220 is shown as an octagonal tool interface, with six equally sized flats 222, although any tool interface is possible.

The tool interface portion 220 has an anti-reversing feature. In the present embodiment, the anti-reversing feature is a pair of sprung pawls 250. The pair of sprung pawls 250 are arranged on a forward face 224 of the tool interface portion 220. The pair of sprung pawls 250 are distributed circumferentially. A first sprung pawl 252 is arranged between a first flat 226 and a second flat 228. The first sprung pawl 252 is thereby positioned at approximately 12 o'clock of the spindle nut 100. A second sprung pawl 254 is arranged between a fourth flat 234 and a fifth flat 236. The second sprung pawl 254 is thereby positioned at approximately 6 o'clock of the spindle nut 200. A first arcuate flange 256 is provided on the forward face 224 of the tool interface portion 220. The first arcuate flange 256 extends between the first sprung pawl 252 and the second sprung pawl 254. A second arcuate flange 258 is provided on the forward face 224 of the tool interface portion 220. The second arcuate flange 258 extends between the first sprung pawl 252 and the second sprung pawl 254, diametrically opposed to the first arcuate flange 256.

The first arcuate flange 256 and the second arcuate flange 258 both have the effect of protecting the sprung pawls 250 from inadvertent damage from a slipping tool or similar.

Each one of the pair of sprung pawls 250 are identical, so only the first sprung pawl 252 shall be described in detail.

Figure 7:
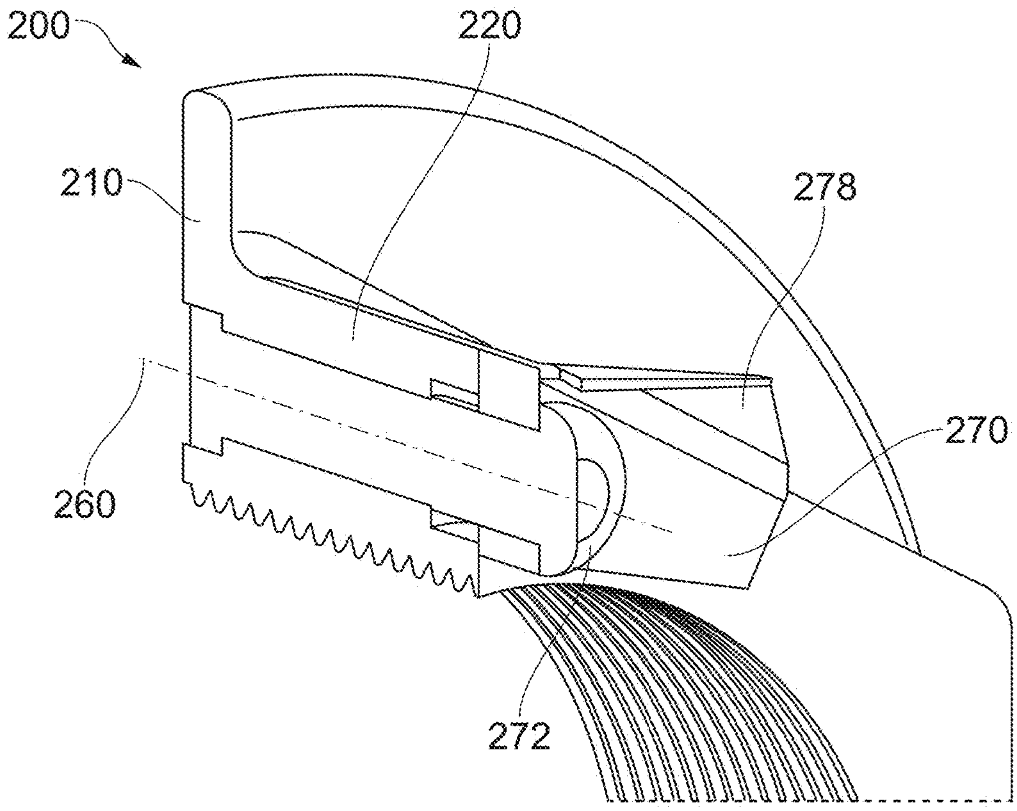
FIG. 7 is an enlarged partial cross-sectional view of the spindle nut of FIG. 5.

The first sprung pawl 252 comprises pawl 270 having a first arm terminating in a tooth 274 and a second arm terminating in a shoulder 276. The tooth 274 is sized to engage a tooth of the spindle as will be described in more detail below. The shoulder 276 includes a chamfer 278. Referring briefly to FIG. 7, a bore having a bore axis 260 extends through the spindle nut 200, through both the washer portion 210 and the tool interface portion 220. The pawl 270 is pivotally mounted on a pin or rivet 272 extending through the bore. The pawl 270 therefore pivots about a bore axis 260 which runs in parallel to the axis 232 of the spindle nut 200.

Figure 8:
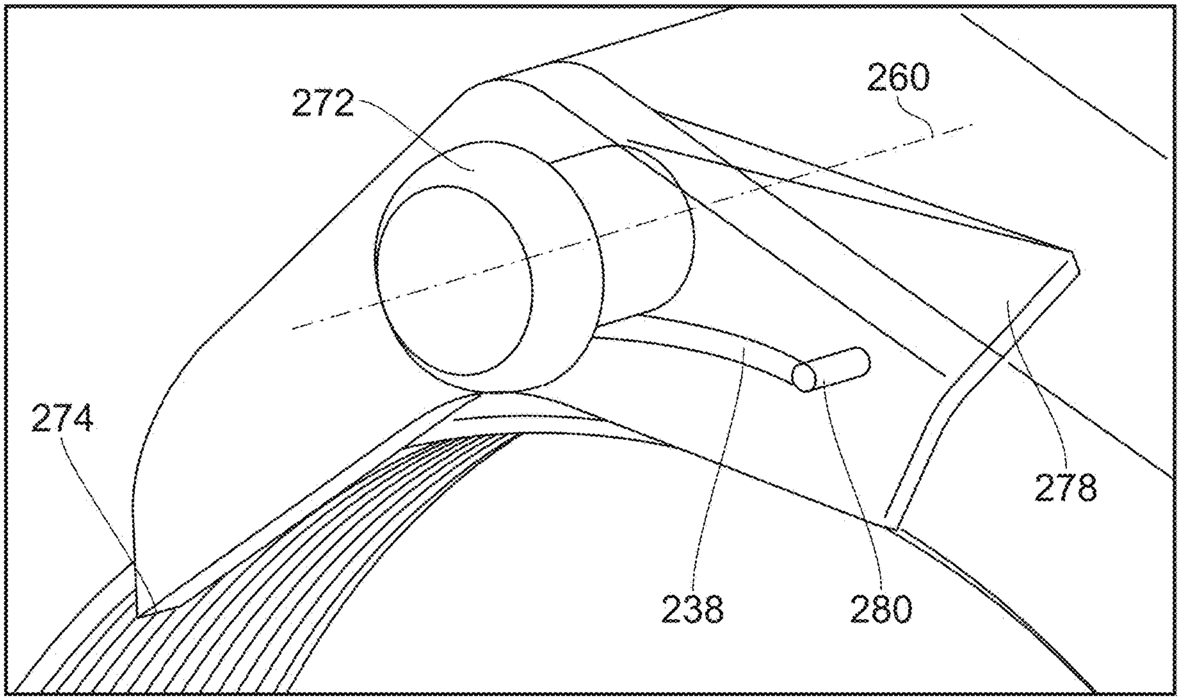
FIG. 8 is an enlarged partial perspective view of the spindle nut of FIG. 5.

The pawl 270 has a groove 238 arrangement on an underside. The groove 238 houses a pawl spring 280 best shown in FIG. 8. The pawl spring is retained about the rivet 272 and bears upon the underside of the pawl 270 adjacent the end with the shoulder 276. The pawl spring 280 is under compression and tends to bias the pawl 270 so that the tooth 274 of the pawl 270 pivots radially toward the center of the bore axis 232. The shoulder 276 is at the opposite end of the pawl 270 as the tooth 274. When the pawl 270 is biased such that the tooth 274 of the pawl 270 extends radially toward the center of the bore axis 232, the shoulder 276 overhangs the tool interface portion 220.

Figure 6:
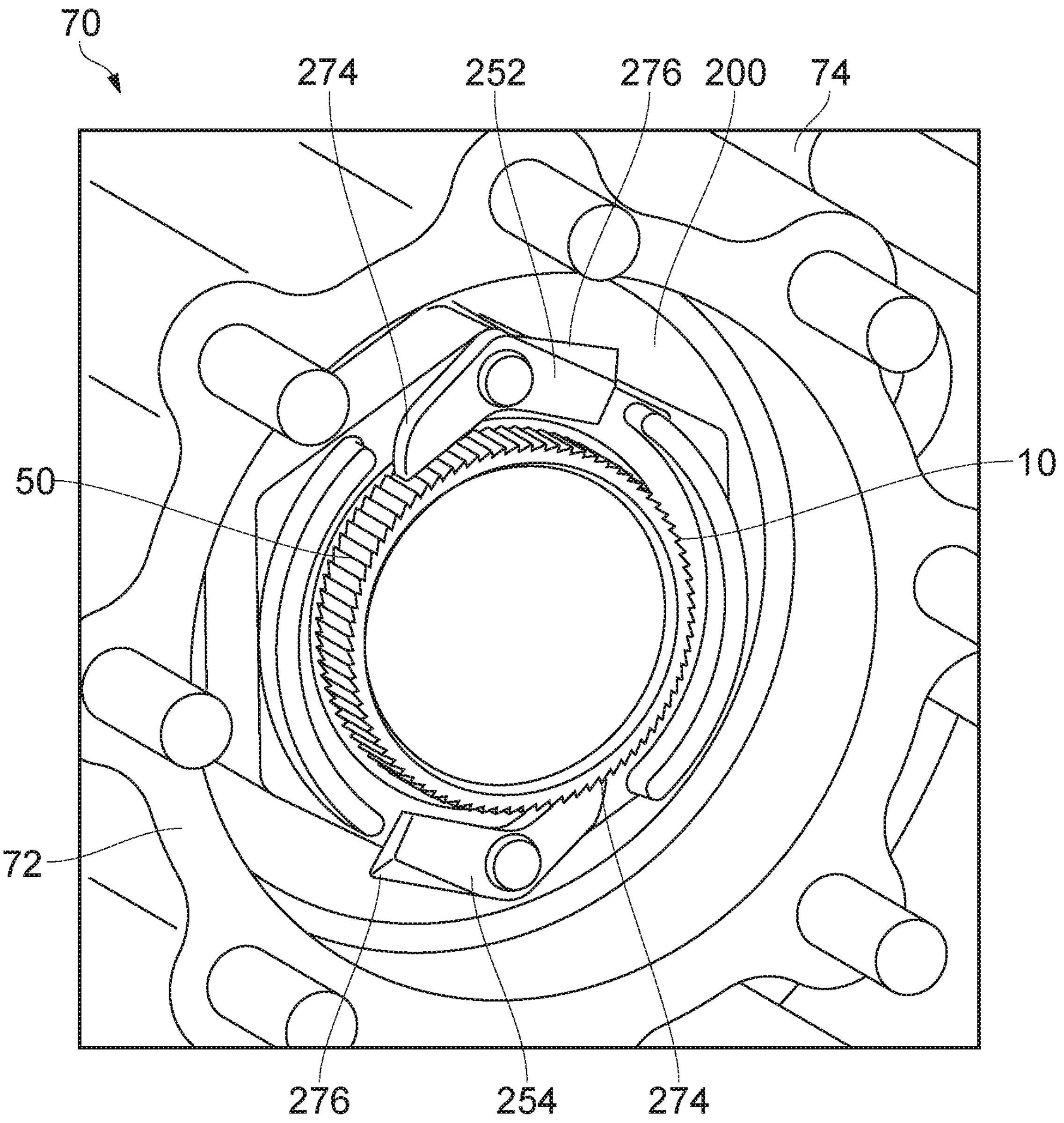
FIG. 6 is a perspective view of the spindle nut of FIG. 5 installed on the spindle of FIG. 2 as part of a wheel end assembly.

FIG. 6 shows an axle system comprising the spindle nut 200 installed on the spindle 10. The axle system is part of a wheel end assembly 70. The wheel end assembly 70 includes a hub assembly 72 and a hub 74 as is known in the art. The spindle nut 200 is in threaded engagement with the spindle 10. The spindle nut 200 holds an outboard bearing cone (not shown).

The first sprung pawl 252 positioned at approximately 12 o'clock of the spindle nut 200, and the second sprung pawl 254 positioned at approximately 6 o'clock of the spindle nut 200 are both shown with the pawl 270 engaged with the ratchet portion 50. The teeth 274 of each pawl 270 abut the ratchet tooth 54 of the ratchet portion 50 and prevent anti-clockwise rotation of the spindle nut 200. Both the first and second sprung pawls 252, 254 are biased into engagement with the ratchet portion 50. When an external force is applied, for example by a wrench socket, both the first and second sprung pawls 252, 254 will be biased out of engagement with the ratchet portion 50, as the socket bears against the respective shoulders 276 of the first and second pawls 252, 254 and against the action of the pawl springs 280. The pawls 270 pivot on their respective rivets 272 until their respective shoulders 176 are in-line with the tool interface portion 220. In this condition the pawl spring 280 is compressed and energized further. This allows anti-clockwise rotation of the spindle nut 200. Removal of the wrench socket de-energizes the pawl spring 280 and causes the pawls 270 to pivot back to their biased condition, that is as shown in FIGS. 5 and 6.

In use, the spindle nut 200 may be installed by hand onto the spindle 10. The sprung pawls 252, 254 engage the ratchet teeth 54 of the spindle ratchet portion 50 to prevent reverse threading of the spindle nut 200 on the spindle 10. To adjust the spindle nut 200, the use of a wrench socket provides an easy disengagement of the sprung pawls 252, 254 as the socket is pushed into position on the spindle nut 200 since the pawls 270 pivot in line with the tool interface portion 220.

In a further embodiment, the sprung pawls 252, 254 are located in a slightly uneven clocking so that the effective precision of the ratchet teeth 54 can be doubled.

Figure 9:
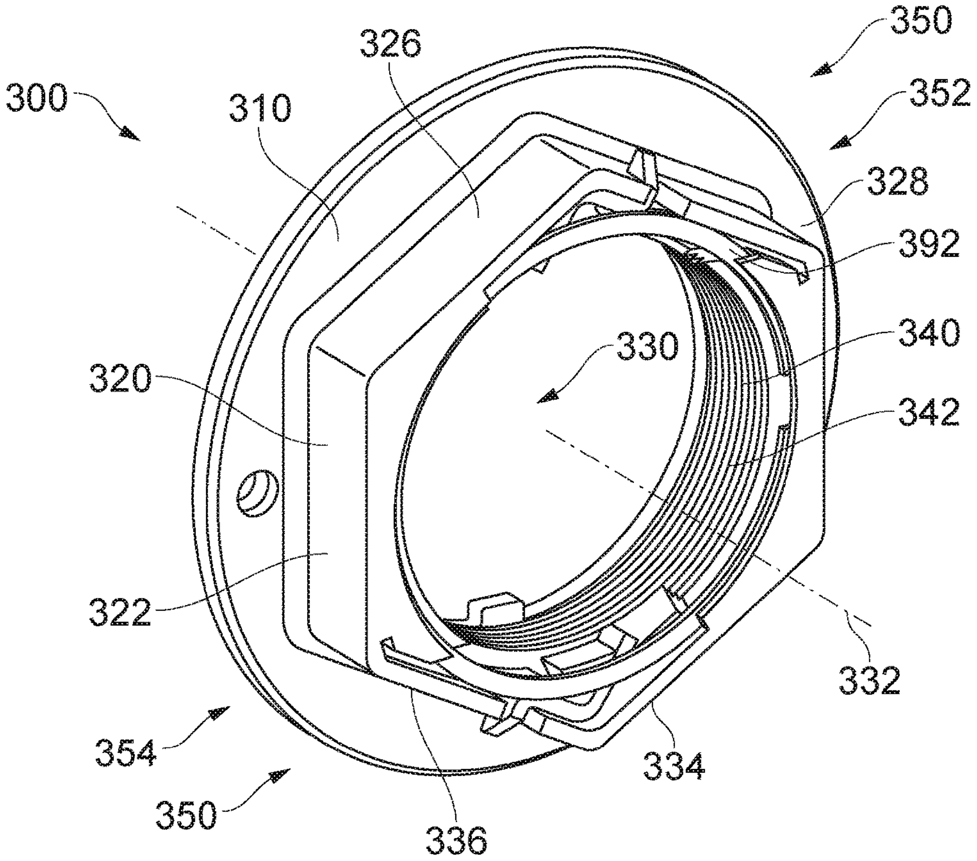
FIG. 9 is a perspective view of a spindle nut according to yet another embodiment of the invention.

FIG. 9 shows view of a spindle nut 300 in accordance with another embodiment of the present invention. Similar reference numerals have been used for features similar to those described in relation to spindle nut 100, pre-fixed with a "3" instead of a "1" to indicate those features as being in relation to spindle nut 300.

In the exemplary embodiments, the spindle nut 300 is designed to engage a spindle to seat a wheel-end assembly. The spindle nut 300 is a unitary body comprising a washer portion 310 and a tool interface portion 320. The washer portion 310 and tool interface portion 320 together define a bore 330 of the spindle nut 300. The bore 330 has an axis 332. The bore 330 is bounded by a threaded portion 340 of the spindle nut 300. The threaded portion 340 has internal threads 342 along the bore 330. The internal threads 342 are shaped to engage corresponding threads on the spindle in this particular example. The tool interface portion 320 is shown as an octagonal tool interface, with six equally sized flats 322, although any tool interface is possible.

The tool interface portion 320 has an anti-reversing feature. In the present embodiment, the anti-reversing feature is a pair of rocker pawls 350. The pair of rocker pawls 350 are arranged within the tool interface portion 220. A first rocker pawl 352 is arranged between a first flat 326 and a second flat 328. The first rocker pawl 352 is thereby positioned at approximately 12 o'clock of the spindle nut 100. A second rocker pawl 354 is arranged between a fourth flat 334 and a fifth flat 336. The second rocker pawl 354 is thereby positioned at approximately 6 o'clock of the spindle nut 200. Each one of the pair of rocker pawls 350 are identical, so only the first rocker pawl 352 shall be described in detail.

Figure 10:
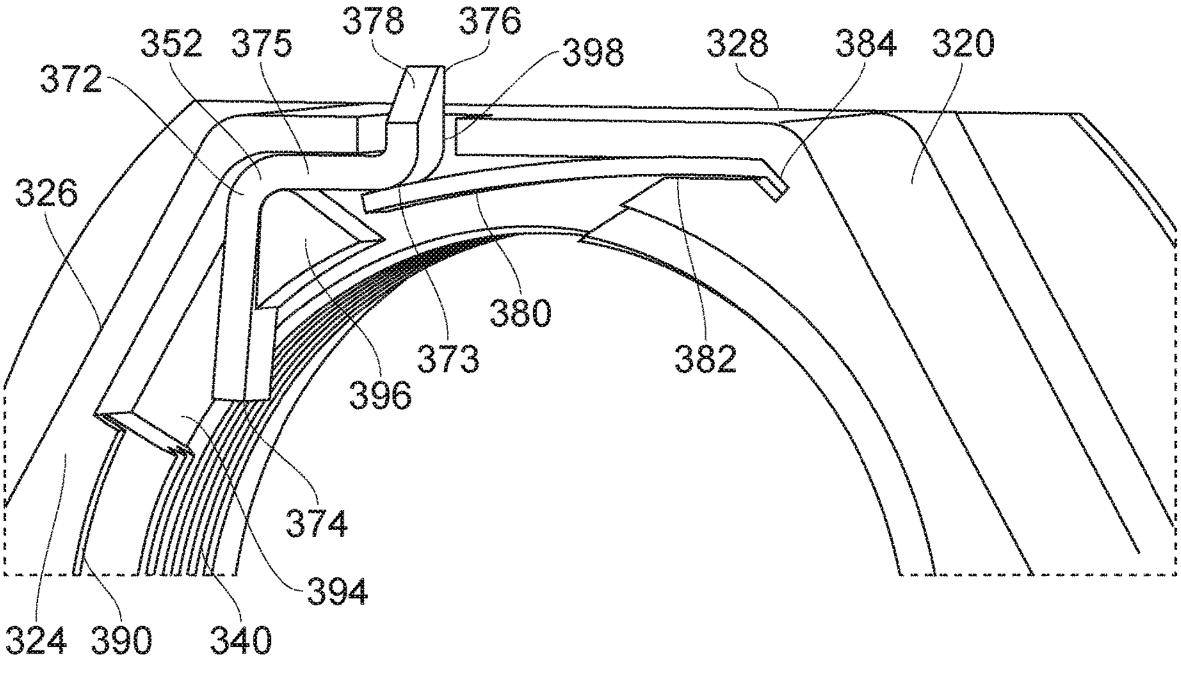
FIG. 10 is an enlarged partial perspective view of the spindle nut of FIG. 9.

Referring to FIG. 10, the first rocker pawl 352 comprises a strip having a first arm, a central portion and a second arm. The strip has first and second bends 372, 373. The first bend connects the first arm with the central portion 375. The second bend 373 connects the second arm with the central portion 375. Both the first and second bends 372, 373 are approximately 90 degrees. The first arm terminates in a tooth 374. The second arm terminates in a shoulder 376. The shoulder 376 includes a chamfer 378. The first rocker pawl 352 has a spring 380.

A forward face 324 of the tool interface portion 320 of the spindle nut 300 is provided with a series of grooves. A circumferential groove 390 is provided to house a retaining ring 392. The retaining ring 392 is a split ring, to allow insertion of the retaining ring 392 into the circumferential groove 390. In the region of each of the first and second rocker pawls 352, 354, a pawl groove 394 is provided and a spring groove 382 is provided. The pawl groove 394 and spring groove 382 for each of the first and second rocker pawls 352, 354 are similar, such that only the pawl groove 394 and spring groove 382 associated with the first rocker pawl 353 shall be described in detail.

The pawl groove 394 is formed within the first and second flats 326, 328 of the tool interface portion 320. The pawl groove 394 runs from the threaded portion 340 into the body of the tool interface portion 320 and back to the threaded portion 340 to define a pivot point 396. The pawl groove 394 exits the tool interface portion 320 at the second flat 328 with an aperture 398 there defined. The spring groove 382 connects to the pawl groove 394, running from the within the second flat 328 towards the pivot point 396. The spring groove 382 terminates in a notch 384.

Figure 11:
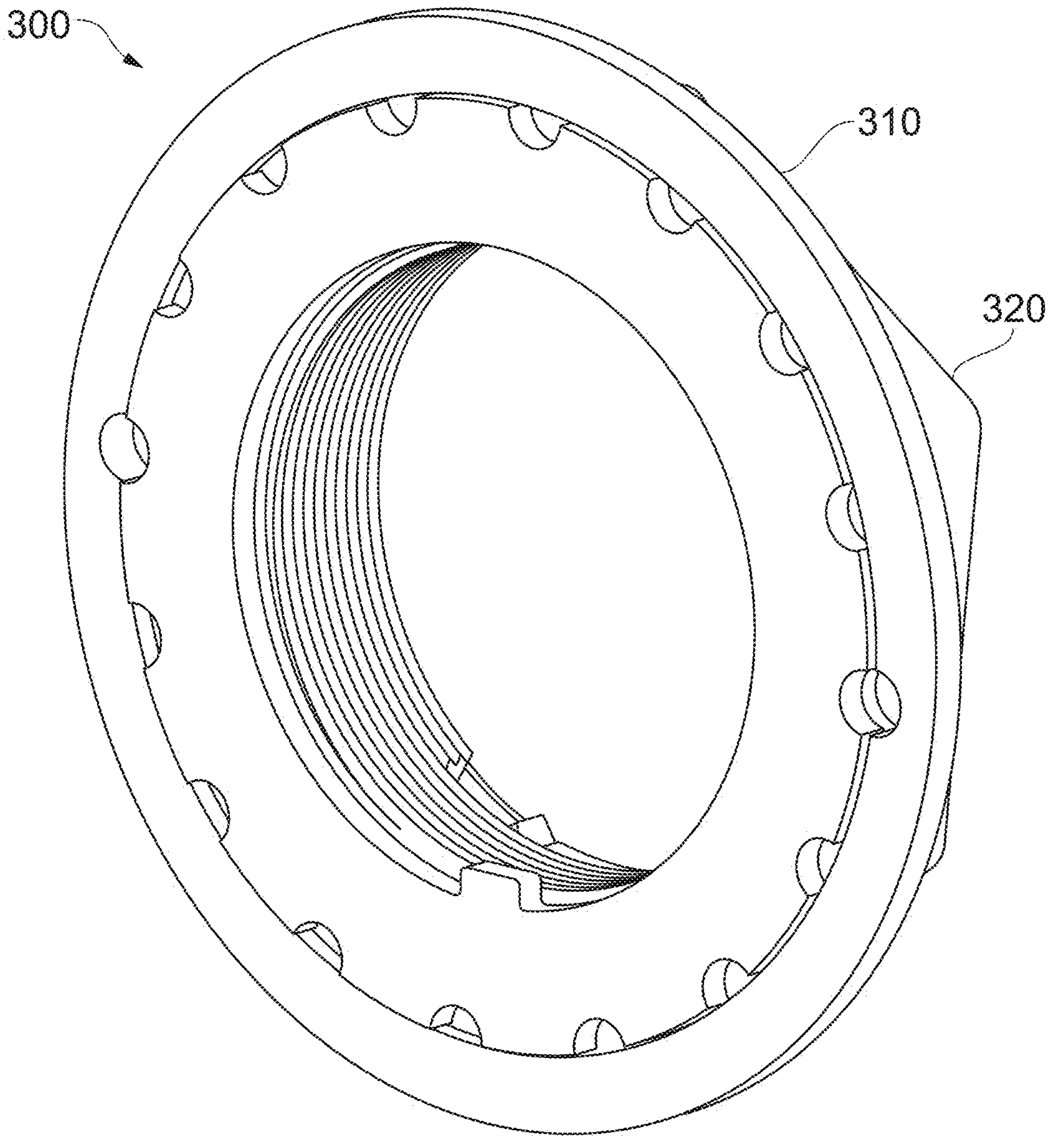
FIG. 11 is a perspective view of the spindle nut of FIG. 9 showing a rear face.

The first rocker pawl 352 is installed in the pawl groove 394 such the first bend 372 sits on the pivot point 396 and the second arm, and the shoulder 376, extends through the aperture 398. The pawl 370 therefore pivots on an axis which runs in parallel to the axis 332 of the spindle nut 300. The first arm, and the tooth 374, extends through the threaded portion 340. The spring 380 is installed in the spring groove 382 such that the spring 380 bears upon the second bend 373 of the first rocker pawl 352. The spring 380 is partially retained in the spring groove 382 by being bent into the notch 384. Both the first rocker pawl and the spring 380 are retained in the respective pawl groove 394 and spring groove 382 by the retaining ring 392. FIG. 11 shows the reverse or inboard side of the spindle nut 300. A tabbed washer is housed within an annular groove.

Figure 12:
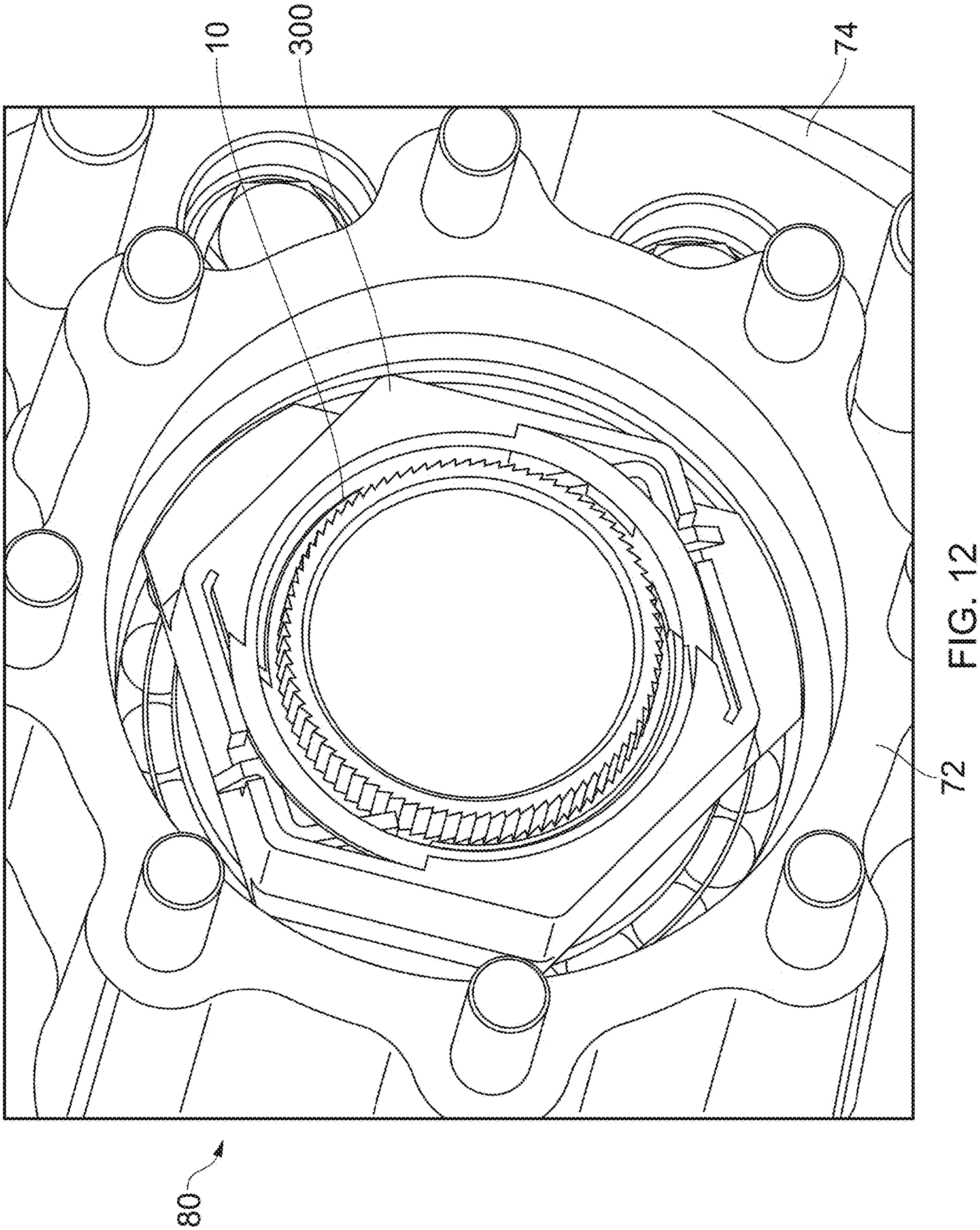
FIG. 12 is a perspective view of the spindle nut of FIG. 9 installed on the spindle of FIG. 2 as part of a wheel end assembly.
Figure 13:
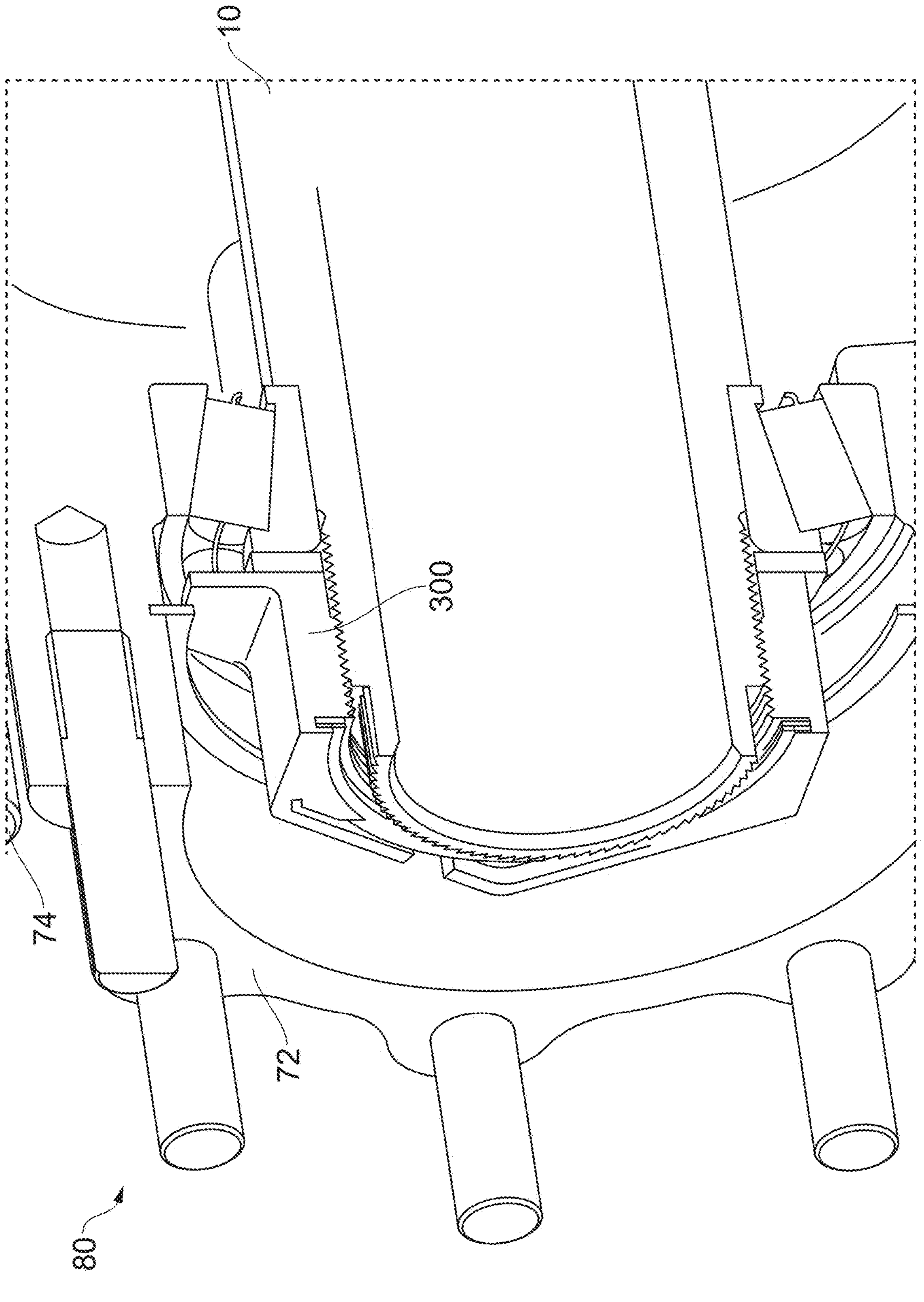
FIG. 13 is a cross-sectional view of FIG. 12
Figure 15:
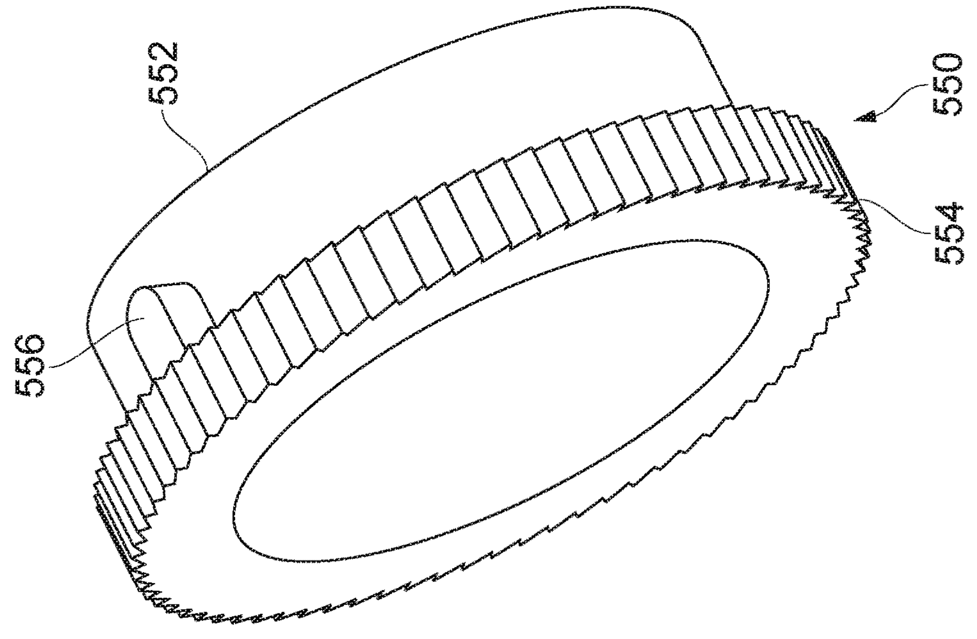
FIG. 15 is an alternate perspective view of a ratchet portion of the spindle of FIG. 14.

FIGS. 12 and 13 show an axle system comprising the spindle nut 300 installed on the spindle 10. The axle system is part of a wheel end assembly 80. The wheel end assembly 80 includes a hub assembly 72 and a hub 74 as is known in the art. The spindle nut 300 is in threaded engagement with the spindle 10. The spindle nut 300 holds an outboard bearing cone.

Figure 14:
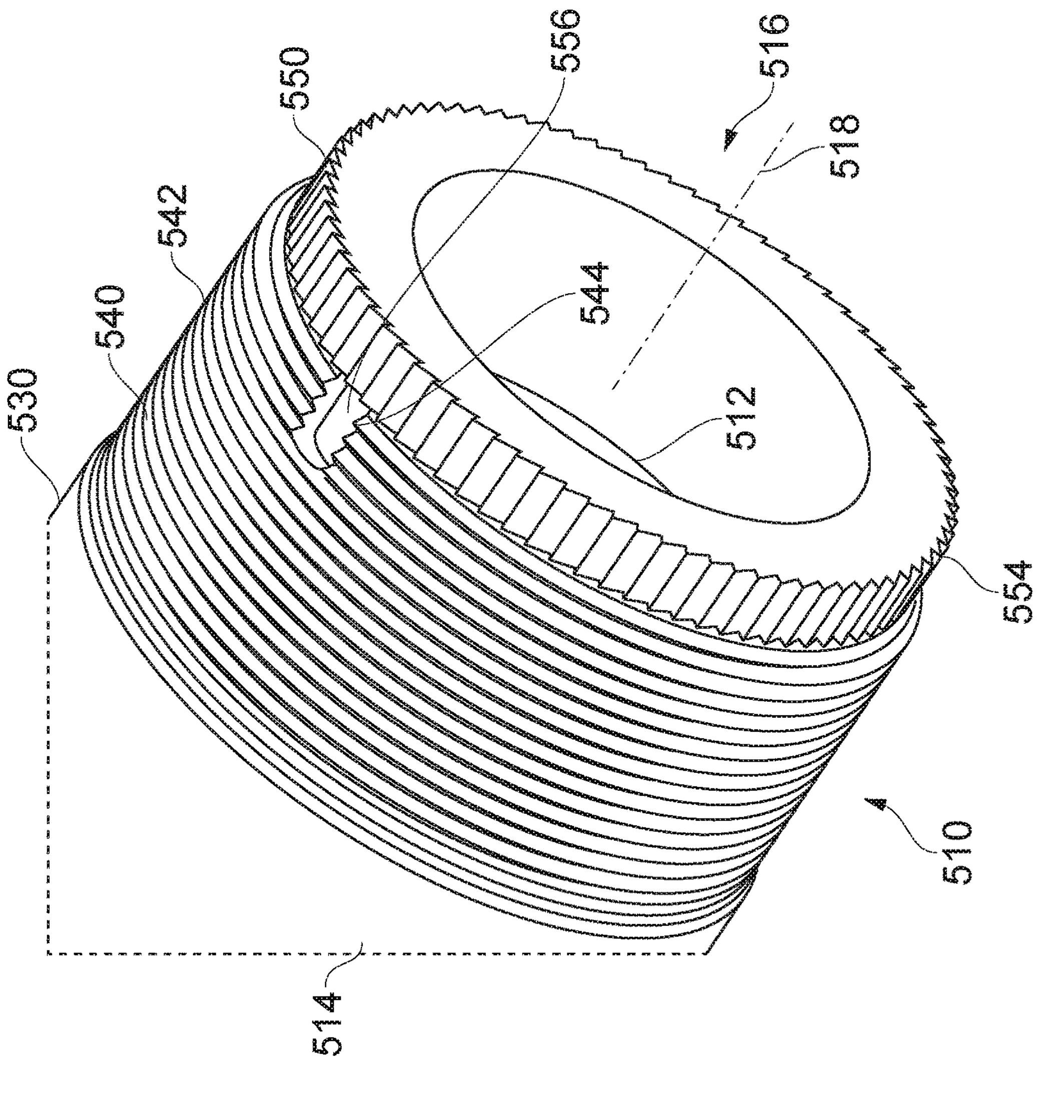
FIG. 14 is a perspective view of a spindle according to another embodiment of the invention.

FIGS. 14 to 17 show alternate spindle arrangements that may be used with any of the spindle nuts 100, 200, 300 in a similar manner to the spindle 10. FIG. 14 shows a hub end of a spindle 510 in accordance with another embodiment of the present invention. Similar reference numerals have been used for features similar to those described in relation to spindle 10, pre-fixed with a "5" to indicate those features as being in relation to spindle 510. The spindle 510 includes a spindle body having an inner peripheral surface 512 and an outer peripheral surface 514. The spindle 510 defines a bore 516 having a spindle axis 518. The bore 516 has a constant diameter. The outer peripheral surface 514 of the spindle 510 is defined by a stepped profile that includes an outboard constant diameter section 530. The term "outboard" refers to a direction that is away from a vehicle center. The outer peripheral surface 514 of the spindle has a threaded portion 540 outboard of the outboard constant diameter section 530. The threaded portion 540 is sized to engage the spindle nut 10. The threaded portion 540 has external threads 542. The external threads 542 are shaped to engage with the corresponding internal threads 142 of the spindle nut 100. A notch 544 is provided in the end of the threaded portion 540 of the spindle 500. Further outboard of the threaded portion 540 is a separate ratchet portion 550. The ratchet portion 550 has an annular extension 552, shown in FIG. 15. A key 556 is provided on an outer peripheral surface of the annular extension 552. The threaded portion 540 and the ratchet portion 550 are connected by insertion of the annular extension 552 into the bore 516 and by engagement of the key 556 into the notch 544. The engagement of the key 556 into the notch 544 prevents relative rotation of the spindle 510 and ratchet portion 550. The rachet portion 550 may be fitted to the spindle 500 via a press-fit. The ratchet portion 550 is provided with teeth 554 aligned with the axis 18 of the spindle 10. The ratchet direction is handed and is matched to the hand of the threads—in FIG. 14 conventional right-handed threads are shown. The ratchet portion 550 can be made using powdered metal or precision forging methods so that separate machining of teeth 554 is not necessary. In another embodiment (not shown) more than one anti-rotation feature may be provided.

Figure 17:
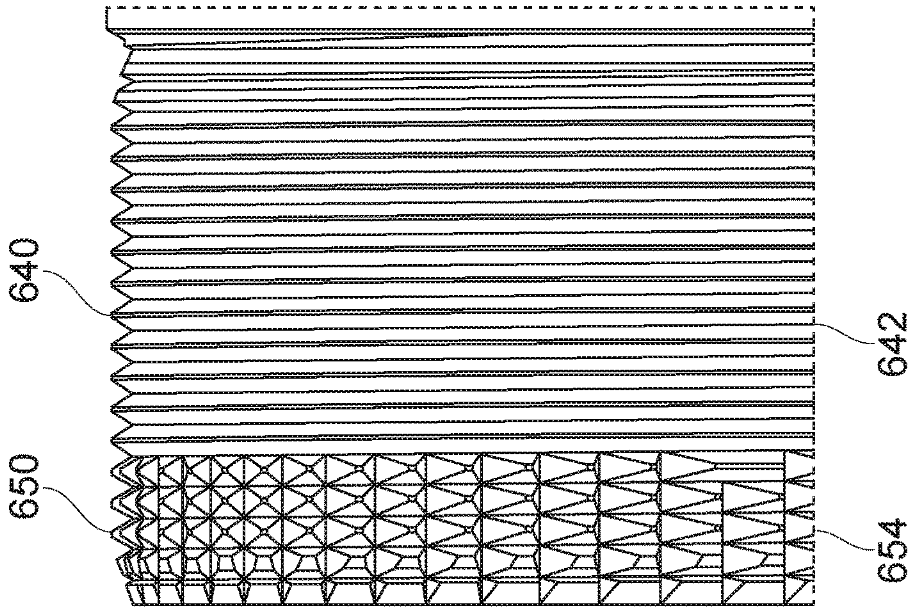
FIG. 17 is a partial side view of the spindle of FIG. 16.
Figure 16:
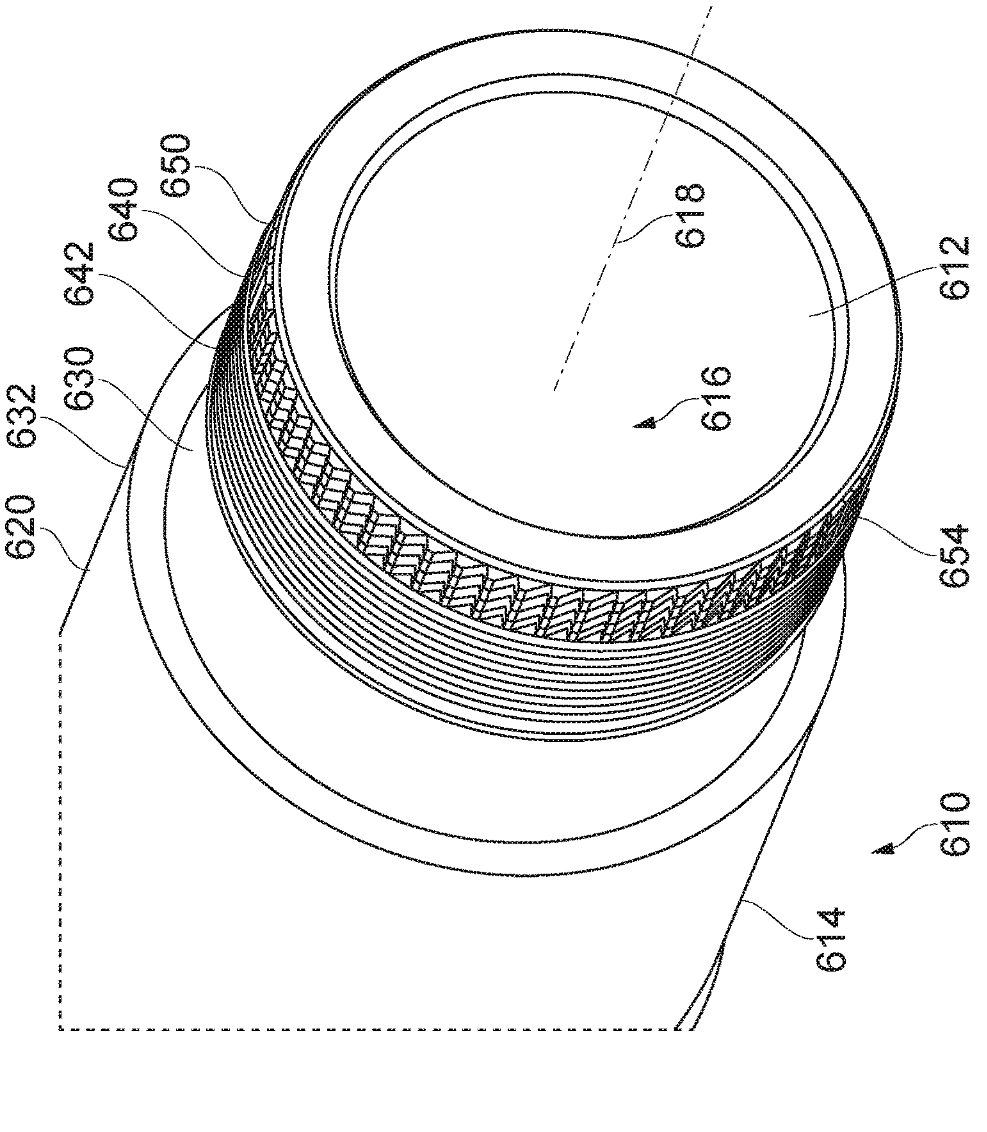
FIG. 16 is a perspective view of a spindle according to yet another embodiment of the invention.

FIG. 16 shows a hub end of a spindle 610 in accordance with another embodiment of the present invention. Similar reference numerals have been used for features similar to those described in relation to spindle 10, pre-fixed with a "6" to indicate those features as being in relation to spindle 610. The spindle 610 includes a spindle body having an inner peripheral surface 612 and an outer peripheral surface 614. The spindle 610 defines a bore 616 having a spindle axis 618. The bore 616 has a constant diameter. The outer peripheral surface 614 of the spindle 610 is defined by a stepped profile that includes an inboard constant diameter section 620 and an outboard constant diameter section 630. The term "inboard" refers to a direction that is toward a vehicle center and the term "outboard" refers to a direction that is away from a vehicle center. The inboard constant diameter section 620 and outboard constant diameter section 630 are connected by an outboard bearing shoulder 632 that is machined or formed about the outer peripheral surface 14 of the spindle 610. The outer peripheral surface 614 of the spindle has a threaded portion 640 outboard of the outboard constant diameter section 630. The threaded portion 640 is sized to engage the spindle nut 610. The threaded portion 640 has external threads 642. The external threads 642 are shaped to engage with the corresponding internal threads 142 of the spindle nut 100. Towards an outboard end of the threaded portion 640 is an integrated ratchet portion 650. The integrated ratchet portion 650 is provided with teeth 654 aligned with the axis 618 of the spindle 610. The teeth 654 are incorporated into the external threads 642 as best shown in FIG. 17. The ratchet direction is handed and is matched to the hand of the threads—in FIG. 16 conventional right-handed threads are shown. The ratchet teeth 654 may be rolled into the spindle 610 prior to cutting external threads 654.

Where the word 'or' appears, this is to be construed to mean 'and/or'. This is such that items referred to are not necessarily mutually exclusive and may be used in any appropriate combination.

The invention has been described above with reference to one or more specific embodiments. However, the description is not exhaustive, and the present invention is not limited to the embodiments described. Various changes and modifications can be made without departing from the scope of the invention as defined in the claims.

The invention claimed is:

1. An axle system comprising a spindle and a spindle nut, wherein the spindle has a threaded portion and a ratchet portion, wherein the ratchet portion is press-fitted to an end of the spindle, the spindle nut has a threaded portion and at least one pawl, wherein the threaded portions are sized to engage one another, and the at least one pawl is arranged to engage the ratchet portion of the spindle.

2. An axle system according to claim 1, wherein the ratchet portion includes an anti-rotation feature that engages with a co-operating anti-rotation feature of the spindle.

3. An axle system according to claim 2, wherein the anti-rotation feature of the ratchet portion is a key and the anti-rotation feature of the spindle is a notch.

4. An axle system according to claim 1, wherein the ratchet portion is handed to match handedness of the threaded portion of the spindle.

5. The axle system according to claim 1, wherein the spindle nut comprises a unitary body having a washer portion and a tool interface portion, wherein the tool interface portion includes the at least one pawl arranged to engage the ratchet portion of the spindle.

6. The axle system according to claim 5, wherein the at least one pawl comprises one of a sprung pawl or a rocker pawl.

7. The axle system according to claim 5, wherein the at least one pawl is biased to engage the ratchet portion of the spindle.

8. The axle system according to claim 5, wherein the at least one pawl comprises a tooth and a shoulder, wherein the shoulder is biased to extend radially beyond the tool interface portion.

9. The axle system according to claim 5, wherein the at least one pawl pivots about an axis which runs in parallel with an axis of the spindle nut.

10. The axle system according to claim 5, wherein the at least one pawl pivots about an axis which runs perpendicularly to an axis of the spindle nut.

11. The axle system according to claim 5, wherein the at least one pawl is biased by a spring, and wherein the ate least one pawl and the spring are retained by a retaining ring.

* * * * *